United States Patent [19]

Stav et al.

[11] Patent Number: 5,858,083

[45] Date of Patent: Jan. 12, 1999

[54] CEMENTITIOUS GYPSUM-CONTAINING BINDERS AND COMPOSITIONS AND MATERIALS MADE THEREFROM

[75] Inventors: Elisha Stav, M.P. Jordan Valley, Israel; Edward A. Burkard; Ronald S. Finkelstein, both of East Amherst, N.Y.; Daniel A. Winkowski, Tonawanda, N.Y.; Lambert J. Metz, Tonawanda, N.Y.; Patrick J. Mudd, Tonawanda, N.Y.

[73] Assignee: National Gypsum Company, Charlotte, N.C.

[21] Appl. No.: 858,243

[22] Filed: May 19, 1997

Related U.S. Application Data

[63] Continuation-in-part of Ser. No. 710,264, Sep. 13, 1996, abandoned, and Ser. No. 713,727, Sep. 13, 1996, Pat. No. 5,685,903, which is a continuation-in-part of Ser. No. 384,756, Feb. 7, 1995, abandoned, which is a continuation-in-part of Ser. No. 253,333, Jun. 3, 1994, abandoned.

[51] Int. Cl.$^6$ ............................... C04B 7/04; C04B 11/28
[52] U.S. Cl. ................... 106/735; 106/672; 106/675; 106/679; 106/680; 106/709; 106/711; 106/715; 106/729; 106/724; 106/732; 106/737; 106/716; 106/772; 106/780; 106/784; 106/788; 106/789; 106/819; 106/676; 106/778
[58] Field of Search ............................. 106/672, 676, 106/679, 680, 705, 715, 716, 724, 732, 737, 778, 788, 819, 784, 735, 711, 709, 729, 772, 780, 789

[56] References Cited

U.S. PATENT DOCUMENTS

| | | |
|---|---|---|
| 1,255,236 | 2/1918 | Schweimler et al. . |
| 1,511,500 | 10/1924 | Brookby . |
| 1,578,250 | 3/1926 | Armstrong . |
| 1,859,853 | 5/1932 | Thomson . |
| 2,341,426 | 2/1944 | Dailey .................................. 106/110 |
| 2,362,060 | 11/1944 | Etridge et al. ........................ 154/45.9 |
| 2,791,511 | 5/1957 | Nutley et al. ......................... 106/109 |
| 2,954,302 | 9/1960 | Gorman ................................ 117/60 |
| 3,017,305 | 1/1962 | Dailey .................................. 156/10 |
| 3,232,777 | 2/1966 | Bush .................................... 106/90 |
| 3,240,736 | 3/1966 | Beckwith ............................. 260/29.2 |
| 3,411,924 | 11/1968 | Lapshin ................................ 106/89 |
| 3,477,979 | 11/1969 | Hillyer ................................. 260/29.2 |
| 3,516,882 | 6/1970 | Cummisford ........................ 156/39 |
| 3,565,648 | 2/1971 | Mori et al. ........................... 106/89 |
| 3,582,376 | 6/1971 | Ames ................................... 106/90 |
| 3,607,486 | 9/1971 | Jacks et al. .......................... 156/41 |
| 3,628,973 | 12/1971 | Greening et al. .................... 106/89 |
| 3,645,750 | 2/1972 | Sadran ................................. 106/104 |
| 3,782,985 | 1/1974 | Gebhardt ............................. 106/97 |
| 3,839,269 | 10/1974 | Comegys ............................. 260/41 |
| 3,847,635 | 11/1974 | Lange et al. ......................... 106/110 |
| 3,853,577 | 12/1974 | Nishida et al. ...................... 117/8 |
| 3,910,798 | 10/1975 | Shires et al. ......................... 106/38.3 |
| 3,988,279 | 10/1976 | Klassen ............................... 260/29.2 |

(List continued on next page.)

FOREIGN PATENT DOCUMENTS

| | | |
|---|---|---|
| 737020 | 6/1966 | Canada . |
| 2062183 | 9/1992 | Canada . |
| 103 119 | 3/1984 | European Pat. Off. . |
| 0 427 064 | 5/1991 | European Pat. Off. . |
| 1.338.701 | 1/1964 | France . |
| 2 643 629 | 8/1990 | France . |
| 2 673 620 | 9/1992 | France . |
| 1 241 330 | 10/1963 | Germany . |
| 1 187 975 | 2/1965 | Germany . |
| 273779 | 8/1969 | Germany . |
| 1 811 177 | 6/1970 | Germany . |
| 2 106 813 | 8/1972 | Germany . |
| 24 30 683 | 1/1976 | Germany . |
| 140 245 | 2/1980 | Germany . |
| 32 30 406 | 2/1984 | Germany . |
| 52-73919 | 6/1977 | Japan . |
| 53-79924 | 7/1978 | Japan . |
| 54-141818 | 11/1979 | Japan . |
| 56-155059 | 12/1981 | Japan . |
| 60-200850 | 10/1985 | Japan . |

(List continued on next page.)

OTHER PUBLICATIONS

PCT International Search Report, International Searching Authority, dated Aug. 28, 1998.

Rath, *Condensed Silica Fume*, (1983 University of Sherbrooke, Quebec, Canada) pp. 1–52. (no month).

Bentur et al., "Gypsum of Improved Performance Using Blends with Portland Cement and Silica Fume"; pp. 1–6; (paper from the Israel Institute of Technology, Haifa, Israel; received by mail on Jul. 12, 1993.).

Kosmatka et al., "Design & Control of Concrete Mixtures"; PCA, 1988 Thirteenth Edition, pp. 15 16, 64, 65. (no month).

Abstracts of DE 32 30 406 and EP 103 119 from Derwent World Patent Index. (no date).

International Search Report Mailed Sep. 14, 1995 in PCT;US95/06543.

Aho, Matti, "Ecocem—the Raute system for the manufacture of cement–bonded particleboard"; *Fiber and Particleboards Bonded With Inorganic Binders*; pp. 75–77; Copyright 1989 by the Forest Products Research Society. (no month).

Bahner et al., "Low–cost retrofitting of existing gypsum board lines to produce value–added gypsum–fiber products"; *Inorganic–Bonded Wood and Fiber Composite Materials*, vol. 3; pp. 90–96; Copyright 1993 by the Forest Products Research Society. (no month).

(List continued on next page.)

*Primary Examiner*—Michael Marcheschi
*Attorney, Agent, or Firm*—Marshall, O'Toole, Gerstein, Murray & Borun

[57] ABSTRACT

Cementitious binders include calcium sulfate beta-hemihydrate, a cement component comprising Portland cement, and either silica fume or rice-husk ash. The silica fume or rice-husk ash component is at least about 92 wt % amorphous silica and has an alumina content of about 0.6 wt % or less.

52 Claims, 6 Drawing Sheets

U.S. PATENT DOCUMENTS

| | | | |
|---|---|---|---|
| 4,067,939 | 1/1978 | Lowe et al. | 264/42 |
| 4,075,374 | 2/1978 | Jorgenson et al. | 427/355 |
| 4,159,912 | 7/1979 | Jorgenson | 106/738 |
| 4,194,919 | 3/1980 | Hattori et al. | 106/90 |
| 4,210,457 | 7/1980 | Dodson et al. | 106/97 |
| 4,240,952 | 12/1980 | Hulbert, Jr. et al. | 260/42.13 |
| 4,304,704 | 12/1981 | Billings | 260/29.6 |
| 4,321,243 | 3/1982 | Cornwell et al. | 423/268 |
| 4,327,146 | 4/1982 | White | 428/308.8 |
| 4,350,533 | 9/1982 | Galer et al. | 106/89 |
| 4,353,746 | 10/1982 | Birchall et al. | 106/89 |
| 4,353,747 | 10/1982 | Birchall et al. | 106/89 |
| 4,353,748 | 10/1982 | Birchall et al. | 106/89 |
| 4,403,006 | 9/1983 | Bruce et al. | 428/70 |
| 4,488,909 | 12/1984 | Galer et al. | 106/89 |
| 4,494,990 | 1/1985 | Harris | 106/90 |
| 4,501,830 | 2/1985 | Miller et al. | 523/401 |
| 4,661,159 | 4/1987 | Ortega et al. | 106/89 |
| 4,684,407 | 8/1987 | Umezawa et al. | 106/90 |
| 4,746,365 | 5/1988 | Babcock et al. | 106/104 |
| 4,849,018 | 7/1989 | Babcock et al. | 106/104 |
| 4,904,503 | 2/1990 | Hilton et al. | 106/15.05 |
| 4,921,537 | 5/1990 | Horiguchi et al. | 106/90 |
| 4,923,665 | 5/1990 | Anderson et al. | 264/259 |
| 4,948,429 | 8/1990 | Arfaei | 106/659 |
| 4,961,787 | 10/1990 | Majumdar et al. | 106/692 |
| 4,964,912 | 10/1990 | Okabayashi et al. | 106/705 |
| 5,030,282 | 7/1991 | Matsuhashi et al. | 106/692 |
| 5,030,289 | 7/1991 | Sattler et al. | 106/805 |
| 5,075,358 | 12/1991 | Riley et al. | 524/5 |
| 5,085,929 | 2/1992 | Bruce et al. | 428/309.9 |
| 5,096,497 | 3/1992 | Beale et al. | 106/692 |
| 5,111,627 | 5/1992 | Brown | 52/126.5 |
| 5,114,487 | 5/1992 | Gartshore et al. | 106/695 |
| 5,116,671 | 5/1992 | Bruce et al. | 428/309.9 |
| 5,121,795 | 6/1992 | Ewert et al. | 166/292 |
| 5,125,455 | 6/1992 | Harris et al. | 166/292 |
| 5,130,184 | 7/1992 | Ellis | 428/245 |
| 5,154,874 | 10/1992 | Koslowski | 264/333 |
| 5,174,821 | 12/1992 | Matsuoka et al. | 106/730 |
| 5,205,091 | 4/1993 | Brown | 52/126.6 |
| 5,227,100 | 7/1993 | Koslowski et al. | 264/26 |
| 5,238,064 | 8/1993 | Dahl et al. | 166/293 |
| 5,273,579 | 12/1993 | Tanaka et al. | 106/715 |
| 5,273,581 | 12/1993 | Koslowski et al. | 106/782 |
| 5,320,677 | 6/1994 | Baig | 106/780 |
| 5,340,612 | 8/1994 | Perito | 106/15.05 |
| 5,346,550 | 9/1994 | Kunzi et al. | 106/735 |
| 5,424,099 | 6/1995 | Stewart et al. | 106/735 |
| 5,439,518 | 8/1995 | Francis et al. | 106/778 |
| 5,482,550 | 1/1996 | Strait | 106/677 |
| 5,571,319 | 11/1996 | Berke et al. | 106/802 |
| 5,685,903 | 11/1997 | Stav et al. | 106/735 |
| 5,718,759 | 2/1998 | Stav | 106/819 |
| 5,762,701 | 6/1998 | Biagini et al. | 106/705 |

FOREIGN PATENT DOCUMENTS

| | | |
|---|---|---|
| 2074843 | 3/1997 | Russian Federation . |
| WO 93/04007 | 3/1993 | WIPO . |
| 95/33698 | 12/1995 | WIPO . |

OTHER PUBLICATIONS

Frick, Egbert, "The Bison system for the production of wood cement particleboards"; *Fiber and Particleboards Bonded With Inorganic Binders*; pp. 63–67; Copyright 1989 by the Forest Products Research Society. (no month).

Frick, Egbert, "The Bison system for the production of wood gypsum particleboards"; *Fiber and Particleboards Bonded With Inorganic Binders*; pp. 98–102; Copyright 1989 by the Forest Products Research Society. (no month).

Heinricks, Hartmut, "Manufacture of non–asbestos cement fiberboards"; *Inorganic Bonded Wood and Fiber Composite Materials*; pp. 120–124 Copyright 1991 by the Forest Products Research Society. (no month).

Hsu, Ernest W., "Blast furnace slag flakeboard"; *Inorganic–Bonded Wood and Fiber Composite Materials*, vol. 3; pp. 48–50; Copyright 1993 by the Forest Products Research Society. (no month).

Kraemer et al., "Gypsum fiberboard–history and outlook"; *Inorganic Bonded Wood and Fiber Composite Materials*; pp. 77–84 Copyright 1991 by the Forest Products Research Society. (no month).

Kuroki et al., "Manufacture of light–weight cement–bonded particleboard in Japan"; *Inorganic–Bonded Wood and Fiber Composite Materials*, vol. 3; pp. 136–142; Copyright 1993 by the Forest Products Research Society. (no month).

Lange et al., "Influence of latent hydraulic binders on the properties of wood–cement composite"; *Fiber and Particleboards Bonded With Inorganic Binders*; pp. 48–52; Copyright 1989 by the Forest Products Research Society. (no month).

Lempfer et al., "Long–term performance of cement–bonded particleboard and fiberboard"; *Fiber and Particleboards Bonded With Inorganic Binders*; pp. 125–132; Copyright 1989 by the Forest Products Research Society. (no month).

Loiri, Veijo, "Plant experience in the manufacture of magnesite and slag particleboards"; *Fiber and Particleboards Bonded With Inorganic Binders*; pp. 110–112; Copyright 1989 by the Forest Products Research Society. (no month).

Miller, Reiner, "The Würtex system for gypsum fiberboard"; *Fiber and Particleboards Bonded With Inorganic Binders*; pp. 103–106; Copyright 1989 by the Forest Products Research Society. (no month).

Moslemi, A.A., "Wood–cement panel products coming of age"; *Fiber and Particleboards Bonded With Inorganic Binders*; pp. 12–18; Copyright 1989 by the Forest Products Research Society. (no month).

Natus, "Gypsum fiberboard production in Nova Scotia, Canada"; *Inorganic Bonded Wood and Fiber Composite Materials*; pp. 85–87 Copyright 1991 by the Forest Products Research Society. (no month).

Petersen, Willy, "Fields of application and production experience gained with gypsum fiberboards"; *Inorganic–Bonded Wood and Fiber Composite Materials*, vol. 3; pp. 83–87; Copyright 1993 by the Forest Products Research Society. (no month).

Sattler et al., "Germanite: a new fiber–reinforced composite for structural applications"; *Inorganic Bonded Wood and Fiber Composite Materials*; pp. 108–116 Copyright 1991 by the Forest Products Research Society. (no month).

Sattler et al., "Gypsum–bonded particleboards and fiberboards"; *Fiber and Particleboards Bonded With Inorganic Binders*; pp. 19–25; Copyright 1989 by the Forest Products Research Society. (no month).

Schwarz, Hans G., "Experience in the manufacture of gypsum–bonded boards"; *Fiber and Particleboards Bonded With Inorganic Binders*; pp. 108–109; Copyright 1989 by the Forest Products Research Society. (no month).

Shigekura, Yuko, "Wood fiberboards bonded with inorganic binders in Japan"; *Fiber and Particleboards Bonded With Inorganic Binders*; pp/ 141–150; Copyright 1989 by the Forest Products Research Society. (no month).

Simatupang et al., "Improving the bond between wood and gypsum"; *Inorganic Bonded Wood and Fiber Composite Materials*; pp. 61–69 Copyright 1991 by the Forest Products Research Society. (no month).

Simatupang et al., "Technologies for rapid production of mineral–bonded wood composite boards"; *Inorganic Bonded Wood and Fiber Composite Materials*; pp. 18–27 Copyright 1991 by the Forest Products Research Society. (no month).

Sinaga et al., "Production and application of hollow fiber concrete panel"; *Inorganic–Bonded Wood and Fiber Composite Materials*, vol. 3; pp. 132–135; Copyright 1993 by the Forest Products Research Society. (no month).

Strohwig, Thomas, "The Unifix process; technology and marketing"; *Inorganic Bonded Wood and Fiber Composite Materials*; pp. 117–119 Copyright 1991 by the Forest Products Research Society. (no month).

Venta, George J., "Gypsum fiberboard: a high performance specialty board"; *Inorganic–Bonded Wood and Fiber Composite Materials*, vol. 3; pp. 66–77; Copyright 1993 by the Forest Products Research Society. (no month).

"Gypsum Fiberboard", *Bisonsystem*, pp. 1–5, (published Apr., 1981).

"Cement–Board Plants", *Bisonsystem* (Germany), pp. 1A–5A (published Apr., 1976).

Dunstan, Edwin R., Jr., "A Spec Odyssey—Sulfate Resistant Concrete for the 1980's," *George Verbect Symposium on Sulfact Resistance of Concrete*, SP 77–3, Publication SP–77, pp. 41–62 (1982). (no month).

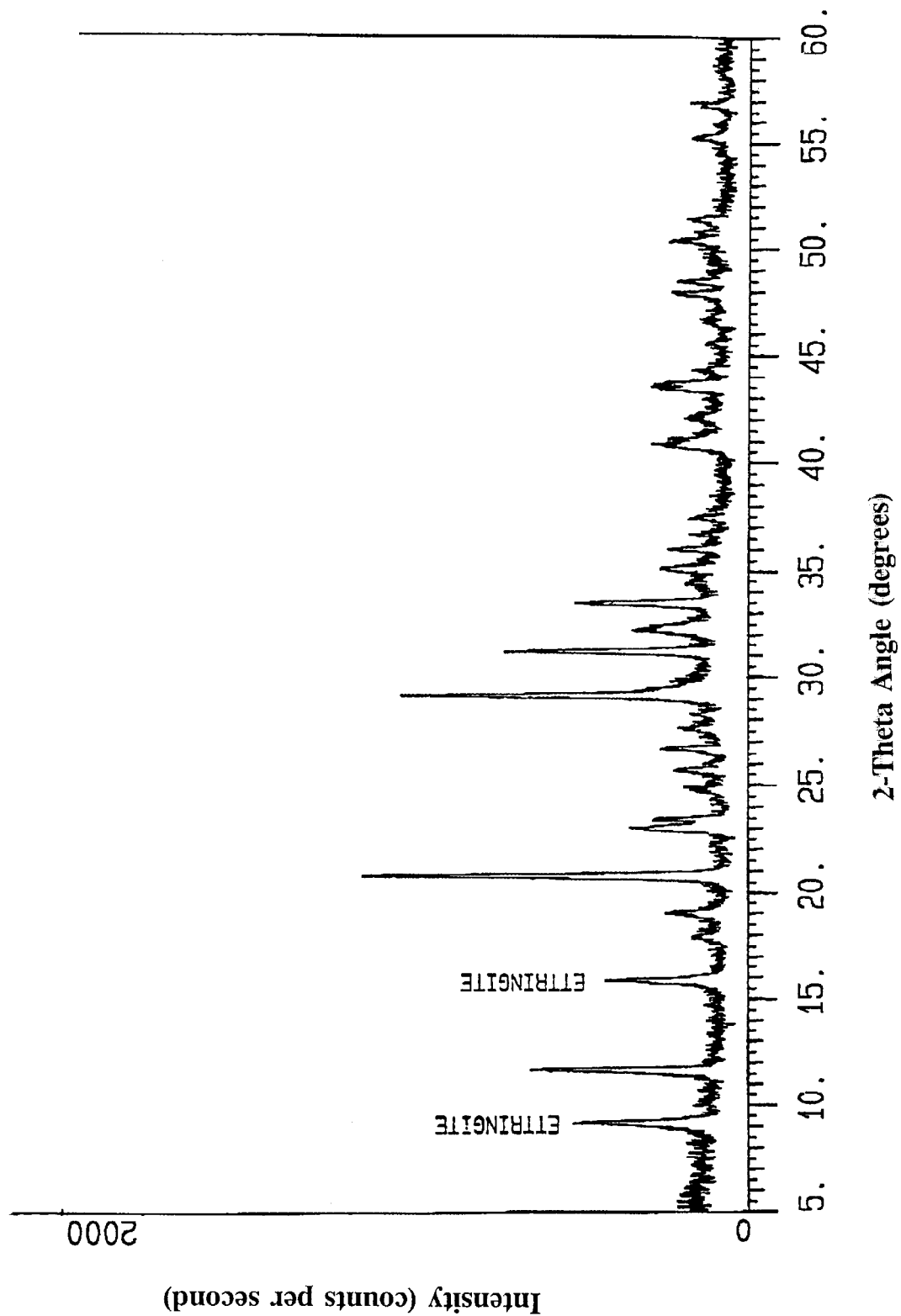

CEMENTITIOUS GYPSUM-CONTAINING BINDERS AND COMPOSITIONS AND MATERIALS MADE THEREFROM

CROSS REFERENCE TO RELATED APPLICATIONS

This is a continuation-in-part of pending U.S. application Ser. No. 08/713,727 filed Sep. 13, 1996, now U.S. Pat. No. 5,685,903 which is a file-wrapper continuation-in-part of U.S. application Ser. No. 08/384,756 filed Feb. 7, 1995, now abandoned, which is a continuation-in-part of U.S. application Ser. No. 08/253,333, filed Jun. 3, 1994, also abandoned. This also is a continuation-in-part of U.S. application Ser. No. 08/710,264, now abandoned, filed Sep. 13, 1996.

BACKGROUND OF THE INVENTION

1. Field of the Invention

The invention relates to cementitious binders and compositions made therefrom. In particular, the invention relates to binders comprising gypsum (calcium sulfate hemihydrate), Portland cement and silica fume, for use in cementitious compositions to made construction materials such as interior and exterior building materials, backer boards, fiberboard, floor underlayments, siding, trim boards, structural framing, floor and road patching materials, fireproofing sprays, and fire-stopping materials.

2. Description of Related Technology

Construction materials, such as external siding and roofing, are typically not manufactured using a calcium sulfate hemihydrate component (i.e., partially dehydrated gypsum) because gypsum-containing materials usually have low water resistance. However, gypsum is a desirable component in construction materials due to its rapid cure and early strength characteristics. Attempts to improve the water-resistance of gypsum boards by mixing Portland cement and calcium sulfate hemihydrate have met with limited success because such a mixture can result in the formation of ettringite, which may cause expansion of the gypsum/Portland cement product and thus lead to its deterioration. It is believed that ettringite ($3CaO \cdot Al_2O_3 \cdot 3CaSO_4 \cdot 32H_2O$) is formed when the alumina in the tricalcium aluminate ($3CaO \cdot Al_2O_3$) present in the Portland cement reacts with lime primarily from the dicalcium silicate ($2CaO \cdot SiO_2$) also present in the Portland cement, and the sulfate from the gypsum ($CaSO_4 \cdot \frac{1}{2}H_2O$), in the presence of water.

A cementitious composition useful as a pavement patching compound which contains Portland cement and alpha gypsum is disclosed in Harris, U.S. Pat. No. 4,494,990. The composition also includes a pozzolan source, such as, for example, silica fume, fly ash or blast furnace slag. The Harris patent discloses that the pozzolan blocks the interaction between the tricalcium aluminate and the sulfate from gypsum. The Harris patent discloses mixing a three-component blend of Type I Portland cement, alpha gypsum and a pozzolan source, silica fume, with a fine aggregate to prepare a mortar used to cast mortar cubes for evaluating the strength of the resulting composition. The Harris patent generally discloses a preference for pozzolans having a "high" degree of fineness, silica content, and degree of amorphousness of the silica.

Ortega et al., U.S. Pat. No. 4,661,159 discloses a floor underlayment composition that includes alpha gypsum, beta gypsum, fly ash and Portland cement. The patent also discloses that the floor underlayment material can be used with water and sand or other aggregate to produce a fluid mixture which may be applied to a substrate.

Sattler et al., U.S. Pat. No. 5,030,289 discloses a first group of molded construction parts made from waste paper or cellulose fibers and a binder made from (1) Portland cements, alumina cements, belite cements, or mixtures thereof; and (2) a pozzolan such as amorphous silicic acid, powdered trass, fly ash, or mixtures thereof. Sattler et al. also discloses a second group of molded construction parts made from fiber and a binder of (1) a latently hydraulic component such as blast sand or blast slag; (2) hemihydrate gypsum; and (3) Portland cement. However, the Sattler et al. patent does not disclose combining gypsum with the cement/pozzolan-containing mixtures used to make the first group of molded construction parts.

SUMMARY OF THE INVENTION

It is an object of the invention to overcome one or more of the problems described above.

According to the invention, a master blend binder includes (1) calcium sulfate beta-hemihydrate; (2) a cement selected from the group consisting of Portland cement, a blend of Portland cement and fly ash, a blend of Portland cement and ground blast slag, and mixtures thereof; and (3) a third component which may be silica fume or rice-husk ash. The third component has a particle average diameter between about 0.1 and about 0.3 microns, has between about 0 wt. % and about 0.6 wt. % $Al_2O_3$, and is at least about 92 wt. % amorphous $SiO_2$. The invention further includes compositions and materials made from the inventive master blend binder.

Other objects and advantages of the invention will be apparent to those skilled in the art from the following detailed description taken in conjunction with the drawings and the appended claims.

BRIEF DESCRIPTION OF THE DRAWINGS

FIG. 9 is an X-Ray diffraction chart of Radiation Counts (intensity) vs. Angle of Diffraction (2-theta angle) of the cube shown in FIG. 7.

DETAILED DESCRIPTION OF THE INVENTION

Figure 1:
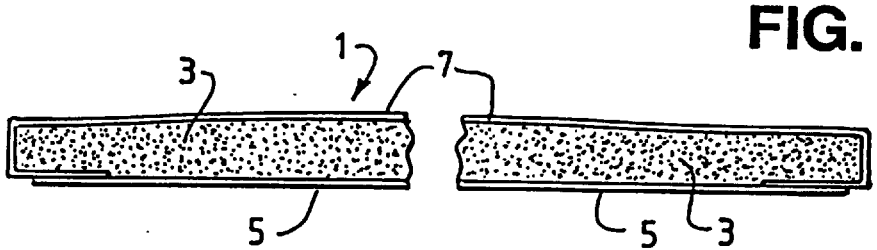
FIG. 1 is a cross-sectional view of a covered board according to the invention.

According to the invention, a master blend binder for use in construction materials is provided which is particularly useful in areas where water resistance is an important consideration, such as for backer boards for baths and showers, floor underlay applications and exterior sheathing boards. Further uses of the inventive binder are for materials such as fiberboard, siding, trim boards, structural framing, self-leveling floors, road patching materials, fire-proofing sprays, and fire-stopping materials.

A master blend binder according to the invention preferably includes about 20 wt. % to about 75 wt. % calcium sulfate beta-hemihydrate (i.e., beta-gypsum), about 10 wt. % to about 60 wt. % Portland cement (Type III is preferred), and about 4 wt. % to about 20 wt. % silica fume. The ratio of silica fume to Portland cement should be at least about 0.3/1.0 when the binder is produced by dry-blending the gypsum, Portland cement and silica fume. If the silica fume is dispersed in water, followed by mixing with dry-blended gypsum and Portland cement, the ratio of silica fume to Portland cement should be at least about 0.2/1.0. Aggregate and/or fiber may be added to the master blend binder to form a construction material.

Preferred binders according to the invention may be categorized by application. For interior applications, such as fiberboard, for use in relatively dry areas, Binder I set forth in Table I, is preferred.

TABLE I

BINDER I (Interior)

| BINDER COMPONENTS[1] | PROCESS | |
|---|---|---|
| | DRY BLEND[2] | SILICA FUME PRE-DISPERSED[3] |
| Gypsum | 60–75 | 60–75 |
| Portland Cement | 20–31 | 21–33 |
| Silica Fume | 6–9 | 4–7 |

[1]All amounts in percent by weight.
[2]Silica fume/Portland cement ratio of at least about .3/1.0.
[3]Silica fume/Portland cement ratio of at least about .2/1.0.

For interior applications, such as shower backer boards, for use in relatively wet areas, Binder II set forth in Table II, is preferred.

TABLE II

BINDER II (Interior/ Wet Areas)

| BINDER COMPONENTS[1] | PROCESS | |
|---|---|---|
| | DRY BLEND[2] | SILICA FUME PRE-DISPERSED[3] |
| Gypsum | 50–60 | 50–60 |
| Portland Cement | 31–37 | 33–42 |
| Silica Fume | 9–11 | 7–8 |

[1]All amounts in percent by weight.
[2]Silica fume/Portland cement ratio of at least about .3/1.0.
[3]Silica fume/Portland cement ratio of at least about .2/1.0.

For exterior applications, such as siding and roofing, Binder III set forth in Table III, is preferred.

TABLE III

BINDER III (Exterior)

| BINDER COMPONENTS[1] | PROCESS | |
|---|---|---|
| | DRY BLEND[2] | SILICA FUME PRE-DISPERSED[3] |
| Gypsum | 40–50 | 40–50 |
| Portland Cement | 39–46 | 42–50 |
| Silica Fume | 12–14 | 9–10 |

[1]All amounts in percent by weight.
[2]Silica fume/Portland cement ratio of at least about .3/1.0.
[3]Silica fume/Portland cement ratio of at least about .2/1.0.

The beta-gypsum component of the inventive master blend binder is calcium sulfate beta hemihydrate, commonly referred to as stucco. Beta-gypsum is traditionally less expensive than alpha-gypsum. Alpha-hemihydrate powder has a higher apparent density and smaller related surface area than beta-hemihydrate, resulting in a lower water requirement for the same workability and a higher compressive strength of the set material. However, boards made from the inventive composition have exhibited more than adequate strength for interior applications such as backer boards and floor underlayments and exterior applications, such as exterior sheeting and eaves.

The Portland cement component of the master blend binder according to the invention may be any of Types I, II, III, IV, or V (or mixtures thereof) as set forth according to ASTM standards. However, Type III Portland cement is preferred. Type III Portland cement develops an earlier high strength than Type I and Type II Portland cement.

Blended cements also may be used in master blend binders according to the invention. Blended cements are blends of Portland cement with one or more pozzolanic materials such as fly ash and blast-furnace slag. The pozzolanic materials that are added to produce a "blend" with Portland cement are distinguished from the pozzolanic aggregate component which may be used with binders according to the invention in that the components of the cement "blend" have a particle size which is in the same range as the particle size range of Portland cement. Portland cement particle size may be defined as having approximately 15% of the particles retained on a 325 mesh screen. In other words, at least 85% of the Portland cement particles pass through a 325 mesh screen (allows particles having a diameter of up to 45 microns to pass through).

The silica fume component of the binder according to the invention is an extremely active pozzolan and prevents the formation of ettringite. The silica fume for use in the invention is very fine (particle average diameter of between about 0.1 microns and about 0.3 microns), has a high surface area (between about 20 meter$^2$/gram and about 30 meter$^2$/gram as measured by BET (Baumer Emit & Tellers)), and is highly amorphous (between about 92 wt. % and about 97 wt. % amorphous $SiO_2$ (glassy material)).

The silica fume component according to the invention includes at most about 0.6 wt. % alumina in the form of aluminum oxide ($Al_2O_3$). Preferably, the silica fume component according to the invention is made from the Silicon Metal Process. Certain silica fume producing processes, such as that from the ferrosilicon alloy industry, are not acceptable for use in the invention as such silica fume includes more than about 0.6 wt. % alumina. An example of a silica fume acceptable for use in the invention is set forth in Table IV below.

Table IV also includes a description of a rice-husk ash, which is an acceptable substitute for the silica fume component of the invention. Because rice-husk ash is currently more expensive to procure than silica fume, it is not as desirable for commercial applications.

TABLE IV

TYPICAL OXIDE ANALYSIS OF A SILICA FUME AND A RICE-HUSK ASH FOR USE IN A BINDER OF THE INVENTION[1]

| Source | Mass Percent[2] | | | | | |
|---|---|---|---|---|---|---|
| | $SiO_2$ | $Al_2O_3$ | $Fe_2O_3$ | CaO | MgO | Alkalies |
| Silica fume from silicon metal industry | 94.00 | 0.06 | 0.03 | 0.50 | 1.10 | 0.10 |
| Rice-husk ash | 92.15 | 0.41 | 0.21 | 0.41 | 0.45 | 2.39 |

[1]Table information taken from Malhotra, M. and Mehta, P. Kumar; Pozzolanic and Cementitious Materials, Advances in Concrete Technology, Vol. 1; p. 19; 1996 (Gordon & Breach Publishers, The Netherlands).
[2]Ignition loss for silica fume: 2.50; for rice-husk ash: 2.77.

In contrast to the silica fume and rice-husk ash components, acceptable for use in the present invention, page 19 of Malhotra, M. and Mehta, P. Kumar, *Pozzolanic and Cementitious Materials, Advances in Concrete Technology*, Vol. 1, discloses typical oxide analyses of silicon fumes made from the ferrosilicon alloy industry having $SiO_2$ amounts of as low as 83% and $Al_2O_3$ amounts from between 1.00% and 2.5%. Page 18 discloses oxide analyses of certain North American blast-furnace slags which have $SiO_2$ amounts of as low as 33% and $Al_2O_3$ amounts as high as 10.8%. Thus, not all pozzolans, and specifically, not all silica fumes, are acceptable for use according to the invention.

Binders according to the invention may be prepared by either a "dry" or a "wet" process. In a "dry" process, the three, dry, binder components (calcium sulfate hemihydrate, Portland cement, and silica fume) are fed to a mixer, such as a large batch or continuous mixer, and blended. The dry-blend is then mixed with water, and other components, as desired, to form a construction product. In a "wet" process, the calcium sulfate hemihydrate and the Portland cement are dry-blended, but the silica fume is first mixed with water (i.e., dispersed in the water). The water containing dispersed silica fume is then mixed with the dry-blended calcium sulfate hemihydrate/Portland cement mixture.

Binders according to the invention made by either the "dry" or "wet" process may then be mixed with aggregate or other fillers to produce compositions according to the invention for use in a variety of applications. For example, binders according to the invention may be mixed with pozzolanic aggregate and/or cellulosic fiber, to produce compositions according to the invention.

Compositions according to the invention may include about 10 wt. % to 100 wt. % of the master blend binder mixed with about 90 wt. % to about 0 wt. % of an aggregate (preferably pozzolanic aggregate) or fiber (preferably about 15 wt % to about 30 wt. % cellulosic fiber), to form a construction material.

Compositions made with binders according to the invention produce construction materials which set up quickly, exhibit high strength and durability, and are water resistant. Products produced from compositions according to the invention may be produced on a continuous line. Because compositions according to the invention set up quickly (typically in three minutes or less), building materials made from such compositions can be handled (e.g. sheets can be cut into smaller sheets or boards) much faster than products made from Portland cement alone. Unlike traditional gypsum board, boards or other products made from compositions according to the invention do not require kiln drying, and in fact, kiln drying should be avoided.

A pozzolanic aggregate which may be mixed with a master blend binder of the invention to create a composition according to the invention may include natural or man-made aggregate that contains a substantial percentage of amorphous silica. Natural pozzolanic aggregates are of volcanic origin and include trass, diatomaceous earth, pumice, and perlite. Man-made pozzolanic aggregates include fly ash and FILLITE (hollow silicate spheres which may be made from fly ash; produced by Fillite Division of Boliden Intertrade, Inc. Atlanta, Ga.). As compared to Portland cement "blend" components of the invention, pozzolanic aggregates used with master blend binders to provide compositions according to the invention are defined herein as having an average particle size larger than that of Portland cement (i.e., average particle diameter larger than 45 microns).

Pozzolanic aggregates contain a substantial amount of amorphous silica which possesses little or no cementitious properties. However, in the presence of moisture, pozzolanic aggregates have surfaces that are chemically reactive with calcium hydroxide at standard temperatures to form hydrated calcium silicate (CSH) which, in compositions and methods according to the invention, are believed to become a homogeneous part of a cementitious system due also to the presence of the finely divided silica fume component of the invention. Compositions according to the invention which include both a pozzolanic aggregate and silica fume (or rice-husk ash), result in cementitious materials wherein the transition zone between the aggregate and a cement paste is densified and thus produces a cured product of higher compressive strength than compositions which utilize a pozzolanic aggregate alone or silica fume with an inert aggregate. It is believed that the mechanism which causes changes in the microstructure of compositions according to the invention to result in higher compressive strengths is associated with two effects: a pozzolanic effect and a microfiller effect (due to the fine size and spherical shape of the silica fume).

Cellulosic fibers may be mixed with a master blend binder of the invention to form a composition according to the invention. Preferred fibers are wood and paper fibers, including recycled waste paper fibers and saw dust, other ligneous materials such as flax and cotton, and mixtures of such fibers. Wood fiber is a particularly preferred cellulosic fiber component for a composition according to the invention.

Most preferably, the fiber is obtained from debarked wood which is refined to long thin flakes having a thickness of about 0.008 inches (about 0.2 mm) to about 0.013 inches (about 0.33 mm) and a length of up to about 1.18 inches (about 30 mm). The flaked wood is then milled and screened and possibly further refined using known processes in order to provide fibers or fiber flakes of substantially constant geometry.

If the wood fiber material used in a composition according to the invention is waste paper, such paper must first be processed to remove foreign material such as plastic, dirt and metals. The paper is then further processed by shredding, preferably with a hammermill/screen assembly. The shredded paper is then preferably dry-refined to result in fibers of substantially constant geometry.

As stated above, compositions according to the invention for use in interior applications preferably are made using the Binder I set forth in Table I. Such a binder may be mixed with cellulosic fiber to produce a fiberboard according to the invention. Preferably, interior fiberboards according to the invention include (i) about 70 wt. % to about 90 wt. % of the Binder I disclosed in Table I; and (ii) about 30 wt. % to about 10 wt. % of a fiber component. Depending on the application, it may be desirable to utilize the Binder II disclosed in Table II for a fiberboard interior application, or even the Binder III disclosed in Table III if the fiberboard is to be used in an exterior application subjected to the elements. For example, a preferred composition for making outdoor siding includes (i) about 70 wt. % to about 75 wt. % of the Binder III disclosed in Table III; and (ii) about 30 wt. % to about 25 wt. % of a wood fiber component. Another preferred composition for making outdoor siding includes (i) about 82 wt. % to about 85 wt. % of the Binder III disclosed in Table III; and (ii) about 18 wt. % to about 15 wt. % cellulosic fiber component.

The fiber component is preferably selected from wood fibers, plant fibers, and paper fibers. It also may be glass fibers, polyethylene fibers, polypropylene fibers, nylon fibers, and other plastic fibers.

A fiberboard according to the invention may be manufactured by the following process:

Raw gypsum may be calcined at about 160° C. (320° F.) to about 175° C. (347° F.) to form calcium sulfate hemihydrate. The calcined gypsum can be post-ground to a finer particle size if, for example, certain strengths, water requirements, and working properties are desired.

All components of the composition, including gypsum, cement, silica fume, water, fiber, and any other additives preferably are added to the batch on a weight basis. Moisture in the wood fiber is measured and compensated for in the make-up water when mixed.

The gypsum powder is fed to a mixer, such as a large batch or continuous mixer, and blended with Portland cement and silica fume. Alternatively, only the gypsum powder and the Portland cement are dry mixed and the silica fume is dispersed in water.

In a second mixer, the fiber is mixed with water (or the silica fume/water mixture) to allow the fiber/water mixture to loosen. The blended dry components of the binder are then added to the fiber/water mixture (or the fiber/water/silica fume) and intensively mixed. Although water may be added to the binder/fiber mixture (or to the binder prior to mixing with the fiber), preferably, the water is added to the fiber and then the dry binder components are added to the water/fiber mixture.

Most preferably, the water addition to the fiber and the subsequent binder addition to the wetted fiber are performed with the aid of computer control so that it is possible to add to the fiber the total quantity of water required for the process (i.e. a slight stoichiometric excess amount of water required for hydration), and then vigorously mix the wetted fiber with the binder.

Other ingredients, such as set control additives (e.g. accelerators), water reducing agents, water repellent additives, retarders, and latex or polymer modifiers may be added to the fiber/binder mixture. Some additives may be added to the dry binder mixture prior to mixing with the wet fiber. Preferably, the composition includes about 0.01 wt. % to about 1.5 wt. % retarder, based upon the total weight of the composition.

The mixed composition is then conveyed directly to a forming machine which spreads an endless mat onto an elongated belt of a continuous press. The mat enters the press on the conveyor belt, is pressed and may be cut into sections, and exits on a conveyor belt in the form of an endless board-ribbon or panel sections. A pressing machine which can be used for this purpose is the BISON-HYDRO-DYN-PRESS (Bison GmbH, Springe, Germany). In such a press, the hydration of the board occurs quickly and may be hastened by warming the board in the press up to an optimal hydration temperature. Preferred processing conditions include pressing at room temperature (about 25° C.) at pressures up to about thirty (30) kg/cm$^2$ for a press/clamping time of about three (3) to about eight (8) hours. Clamping time is minimized utilizing compositions according to the invention as compared to cement fiberboard which requires up to about sixteen hours of press/clamping time.

The board-ribbon (or panel sections) leaving the press has sufficient green strength so that it can be transferred onto a conveyor which will carry the board forward to a cutting station. Hydration may continue as the board-ribbon or panel sections are conveyed to the board cutter. The board-ribbon is then cut or sawed to a desired panel length. If necessary, the panels are then dried to a final moisture content.

Finally the board panels are trimmed and, if desired, split lengthwise to a final dimension. Boards are typically cut into 3 ft. (0.9 meter)×5 ft. (1.5 meter) sheets, and have a thickness between about ½ inch (about 1.3 cm) and about ⅝ inch (about 1.6 cm).

Compositions for construction materials such as backer boards and floor underlays according to the invention preferably are made from the Binder II disclosed in Table II. Such compositions may include about 10 wt. % to about 50 wt. % of a pozzolanic aggregate (about 25 wt. % to about 35 wt. % is preferred). A preferred aggregate for use in such construction materials is pumice. Pumice is desirable as it is relatively light weight and can be sized to result in a product of desirable strength and physical properties. For example, Hess Pumice Products Inc. manufactures a size No. 10 pumice aggregate that measures about 93% greater than 1400 microns, while the size No. 5 pumice aggregate has a particle size measurement of about 23% greater than 1400 microns.

Although aggregates such as calcium carbonate, crystalline silica and different types of clay could be included in the composition, it has been found that the use of a pozzolanic aggregate results in a product according to the invention having superior properties. As explained above, this is believed to occur because the surfaces of the pozzolanic aggregate filler react with free lime to form hydrated calcium silicate (pozzolanic reaction) which becomes part of the product matrix. Such a reaction is only possible with pozzolanic aggregates.

With reference to FIG. 1, a backer board 1 according to the invention comprises a core 3 made from a cementitious composition according to the invention and adjacent cover sheets 5 and 7 disposed at either side thereof. Such a board may be manufactured by the following process:

Raw gypsum may be calcined at about 160° C. (320° F.) to about 175° C. (347° F.) to form calcium sulfate hemihydrate. The calcined gypsum can be post-ground to a finer particle size if, for example, certain strengths, water requirements, and working properties are desired. In a "dry" blend process according to the invention, the gypsum powder is fed to a mixer and blended with Portland cement, silica fume and optionally, a pozzolanic aggregate. The pozzolanic aggregate may be pumice, perlite, trass, or fly ash or a mixture thereof. Cellulosic fiber may be added to the binder/ aggregate mixture. Other ingredients that may be included in the composition are set control additives (e.g. accelerators), water reducing agents, water repellent additives and latex or polymer modifiers. The resulting dry blend is combined with a slight stoichiometric excess of water to produce a slurry.

In a "wet" process according to the invention, the silica fume component is first dispersed in water. The gypsum and Portland cement are dry blended, followed by mixing with the silica fume/water mixture to produce a slurry. In comparison to the "dry process" where the ratio of silica fume to Portland cement should be at least about 0.30/1.0, utilizing a "wet" pre-dispersed silica fume, the silica fume to Portland cement ratio may be lowered to a minimum of about 0.20/1.0.

The binder/aggregate (and/or fiber) slurry, which forms the core 3 of the board, may be poured onto a lower, continuous cover sheet 5 which is disposed on a conveyor. Then, an upper continuous cover sheet 7 is placed on the core as it moves on the conveyor. The cover sheets 5 and 7 are preferably made from fiberglass matt, fiberglass scrim, or a composite of both. The cover sheets may also be non-woven or woven materials, such as polyethylene, polypropylene or nylon. As the slurry sets, scrim and mat are imbedded into the slurry matrix during the forming process. As the covered board moves along the conveyor line in a continuous sheet, the board gains sufficient strength so that it can be handled. The board is then cut into sections, (for backer boards, usually either 3 ft.×5 ft. or 3 ft.×4 ft. sheets) and transferred to pallets. The board thickness preferably ranges between about ⅛ inch and about ⅝ inch. The boards are then preferably stacked and cured from one to seven days (particularly preferred about three days) at a temperature of about 16° C. (60° F.) to about 27° C. (80° F.) (i.e. room temperature) and a humidity of about 40% to about 70%, after which the boards may be sent to a customer. The stacking of the boards advantageously provides a moist environment for curing. The boards may be cured at temperatures and humidities outside of the above-stated ranges resulting in an acceptable product. However, this may extend the curing time. A board according to the invention usually substantially reaches a majority of its strength about fourteen to about twenty-eight days after formation.

When preparing a board or other product according to the invention, the forced drying required for gypsum board should be avoided. An alternative curing procedure is to cover or wrap the boards in plastic wrapping for about three to seven days, depending upon the formulation of the composition, to retain moisture for continuous curing. Such covered boards have exhibited about 50% higher strength than normal gypsum boards of the same density. Also, the covered boards develop about 70% to about 80% of their ultimate strength in three days. Some form of moderate drying (110° F.±4°) may be needed for some products.

When a board or other product, such as a floor underlayment, having a thickness of about ⅛ inch is desired, the cementitious composition thereof is preferably made from Binder I which is then mixed with up to about 50 wt. % pozzolanic aggregate filler, resulting in a very strong thin product, especially useful, for example, for floor underlayments.

Compositions according to the invention may also be used to prepare self-leveling floor compositions and road patching materials. Such materials are preferably made from the Binder III disclosed in Table III. The binder is then mixed with aggregate, such as a local quartz sand, to form the floor or road patching material.

Preferably, a self-leveling floor composition according to the invention includes (i) about 15 wt. % to about 75 wt. % the Binder III disclosed in Table III; and (ii) about 85 wt. % to about 25 wt. % aggregate in the form of sand. The aggregate component may further include up to about 2 wt. % FILLITE pozzolanic aggregate. Because of its low density, FILLITE addition of amounts as low as about 1 wt. % of the composition provide a considerable volume of aggregate (see Example 2, Table II for FILLITE physical properties).

A preferred road patching composition according to the invention includes (i) about 25 wt. % to about 100 wt. % of the Binder III disclosed in Table III; and (ii) about 75 wt. % to about 0 wt. % sand.

Fire-proofing sprays and fire-stopping materials may also be prepared using master blend binders according to the invention. Such fire-proofing and fire-stopping materials preferably include about 54 wt. % to about 99 wt. % of the Binder I disclosed in Table I, about 0 wt. % to about 27 wt. % pozzolanic aggregate, about 1 wt. % to about 16 wt. % vermiculite ore, about 0 wt. % to about 2 wt. % glass fiber, and about 0 wt. % to about 1 wt. % thickening agent which may be made from cellulose derivatives, acrylic resins and mixtures thereof (e.g., a cellulosic thickener, such as METH-ACEL (produced by Dow Chemical USA, Midland, Mich.). If a pozzolanic aggregate is used, it is preferably FILLITE or perlite or mixtures thereof.

EXAMPLE 1

A master blend binder according to the invention having a silica fume/Portland cement ratio of about 0.3/1.0 was prepared with the components set forth in the amounts stated in Table V below:

TABLE V

| Material | Approx. Weight Percent |
|---|---|
| Beta-gypsum (Stucco) | 74 |
| Type III Portland Cement | 20 |
| Silica Fume | 6 |

A self-leveling floor composition #1 according to the invention was prepared with the components set forth in the amounts stated in Table VI below. A cementitious composition #2 with components also set forth in the amounts stated in Table VI below (which did not include a pozzolanic aggregate) was also prepared.

TABLE VI

| Material | Composition #1 (weight percent) | Composition #2 (weight percent) |
|---|---|---|
| Binder from Table V | 54.04 | 48.86 |
| FILLITE 500 Pozzolanic Aggregate[1] | 1.35 | 0.0 |
| Sand (quartz; crystallized silica) | 43.26 | 49.4 |
| W.R.A.[2] | 0.9 | 0.82 |
| Retarder[3] | 0.06 | 0.06 |
| Anti-foaming agent[4] | 0.26 | 0.33 |

[1]Fillite Division of Boliden Intertrade, Inc., Atlanta Georgia. Hollow silicate spheres with the following physical properties: average particle density of 0.6–0.8 g/cc; average bulk density of 0.35–0.45 g/cc; and typical particle size of 5–300 microns. The shell composition includes 27 wt. % to 33 wt. % $Al_2O_3$, 55 wt. % to 65 wt. % $SiO_2$, and a maximum of 4 wt. % $Fe_2O_3$.

TABLE VI-continued

| Material | Composition #1 (weight percent) | Composition #2 (weight percent) |
|---|---|---|

[2] Water reducing agent or wetting agent including lignosulfonates and/or naphthalene sulfonates manufactured by Georgia Pacific Corp. and Henkel Corp., respectively.
[3] A natural protein-based material.
[4] A vegetable oil-based dry powder.

In order to form a floor composition of a smooth consistency, composition #1 was mixed with about 26 wt. % water and composition #2 was mixed with about 24 wt. % water. The density of composition #1 was 107 lbs./ft$^3$. The density of composition #2 was 111.62 lbs./ft$^3$.

Both compositions were allowed to dry at about 21° C. (70° F.) and a relative humidity of about 50%. The compressive strengths of samples (2 inch by 2 inch by 2 inch cubes) of each of the compositions were tested after 2 hours of drying, and after 1, 3, 7 and 28 days by pressing in an Instron press according to ASTM C472-9A.

Figure 2:
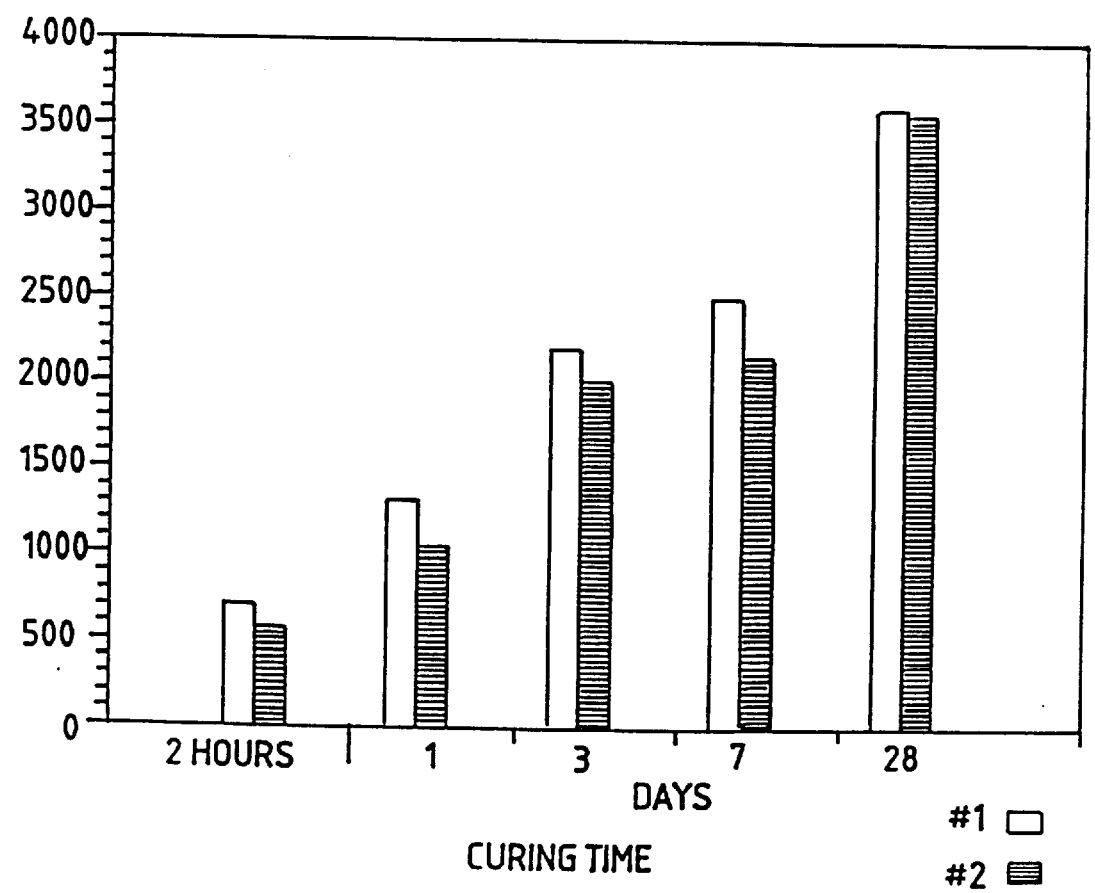
FIG. 2 is a graph depicting compressive strength vs. curing time for a composition #1 according to the invention and a comparative composition #2.

The results of the compressive strength tests are shown in FIG. 2. Composition #1 according to the invention exhibited a greater compressive strength than Composition #2 for all samples tested. Although the compressive strengths of both compositions were similar after curing for 28 days, the advantage of a composition according to the invention is evident when the densities of the two compositions are taken into consideration. Typically, a composition having a higher density should also exhibit a higher compressive strength. However, in this instance, Composition #1 according to the invention had a lower density than Composition #2, and yet exhibited a slightly higher compressive strength.

EXAMPLE 2

A master blend binder according to the invention having a silica fume/Portland cement ratio of about 0.3/1.0 was prepared with the components set forth in the amounts stated in Table VII below:

TABLE VII

| Material | Approx. Weight Percent |
|---|---|
| Beta-gypsum (Stucco) | 40 |
| Type III Portland Cement | 46 |
| Silica Fume | 14 |
| Accelerator[1] | 0.35 |

[1] BMA (board milling accelerator, a fine-ground gypsum produced by National Gypsum Company).

The materials identified in Table VII were dry mixed to form the master blend binder. Then, about 75 wt. % of the binder was mixed with about 25 wt. % pumice aggregate (Hess Products, Inc., Malard City, Ida.) and 100 grams thereof was mixed with 43 grams of water. To improve the workability of the mixture, a water reducing agent (lignosulfonates and/or naphthalene sulfonates manufactured by Georgia Pacific Corp. and Henkel Corp., respectively) was added. The mixture was then formed into two-inch by two-inch by two-inch (2"×2"×2") cubes to evaluate strength gain over the time lapse of twenty-eight days. The cubes were sealed in a plastic bag and kept at room temperature (about 25° C.).

For the purpose of comparison, about 75 wt. % of the master blend binder of Table VII was mixed with about 25 wt. % of calcium carbonate (CaCO$_3$), a non-pozzolanic aggregate having about the same particle size as the pumice, and 100 grams thereof was mixed with 44 grams of water. This mixture also was formed into two-inch by two-inch by two-inch (2"×2"×2") cubes to evaluate strength gain over the time lapse of twenty-eight days. The cubes were sealed in a plastic bag and kept at room temperature (about 25° C.).

The density and wet compressive strengths for the samples made according to the invention and the comparative samples made with CaCO$_3$ were measured and are shown in Table VIII below:

TABLE VIII

| Time Elapsed Days | Sample Made With Pozzolanic Aggregate[1] | | Sample Made With Non-Pozzolanic Aggregate[2] | |
|---|---|---|---|---|
| | Density[3] | Wet Compressive Strength[4] | Density[3] | Wet Compressive Strength[4] |
| 1 | 79.8 | 1151 | 87.0 | 725 |
| 3 | 83.3 | 1779 | 88.9 | 1329 |
| 7 | 83.3 | 2646 | 92.6 | 2155 |
| 28 | 84.8 | 4267 | 92.8 | 3983 |

[1] Pumice (Hess Products, Inc., Malard City, Idaho).
[2] Calcium carbonate.
[3] Pounds/cubic foot.
[4] Pounds/square inch.

Table VIII illustrates the acceptable weight strength development of the samples made from a composition according to the invention.

A second test was performed on the composition made from 75 wt. % master blend binder of Table VII and the pumice aggregate to study durability. A four and one-half inch (4½") diameter, one-half inch (½") thick patty of the composition was placed under running water for a period of two months. No deterioration of the patty was visible and the total weight loss of the patty after the two-month test was 0.5%.

In other tests, the master blend binder disclosed in Table VII was blended with up to about 50 wt. % pozzolanic aggregate filler (pumice or perlite), with and without foaming agent, to produce boards according to the invention. Such boards exhibited acceptable physical properties as tested to pertinent ASTM standards.

EXAMPLE 3

A master blend binder according to the invention having a silica fume/Portland cement ratio of about 0.3/1.0 was prepared by dry-mixing the components set forth in the amounts stated in Table IX below:

TABLE IX

| Material | Weight Percent |
|---|---|
| Beta-gypsum (Stucco) | 40 |
| Type III Portland Cement | 46 |
| Silica Fume | 14 |

About 75% by weight of the dry-blended binder identified in Table IX was mixed with about 25 wt. % (dry weight) of wood fiber that had been mixed with water (slight stoichiometric excess). The wetted fiber and binder were vigorously mixed, formed into mats and pressed into sample boards using a laboratory press (manufactured by Bison GmbH, Springe, Germany). The pressing conditions included 30 kg/cm$^2$ pressure; press temperature of about 25° C.; and a press time of three hours.

The samples exhibited excellent dry and wet durability even when subjected to a continuous water spray. The final products had an extremely smooth surface.

Certain physical properties of boards made according to Example 3 were tested, including percent linear variation (ASTM D 1037), percent water absorption (ASTM D 1037), Mor's 3-Point Loading (ASTM C 947; and nail pull (ASTM C 473). For each of these tests, gypsum/cement/silica fume (GCSF) boards made according to Example 3 were compared to cement fiber boards made of about 82 wt. % Portland cement and about 18 wt. % cellulosic fiber. The press time required for the cement fiber boards ranged between seven to ten hours.

The results of the tests are set forth in the following tables:

TABLE X

LINEAR VARIATION (%) (ASTM D 1037)

| | 70° F./ 50% RH[3] to 90° F./ 90% RH[3] | | 70° F./ 50% RH[3] to 109° F. (Bone Dry) | |
| --- | --- | --- | --- | --- |
| | Long Direction | Short Direction | Long Direction | Short Direction |
| GCSF[1] | +0.125 | +0.125 | −0.155 | −0.155 |
| Cement[2] | +0.177 | +0.175 | −0.195 | −0.192 |

[1]Gypsum/cement/silica fume fiber board.
[2]Cement fiber board.
[3]Relative humidity.

TABLE XI

WATER ABSORPTION (%) (ASTM D 1037)

| | Percent by Weight | | Percent Caliper Swell | |
| --- | --- | --- | --- | --- |
| | 2 Hours | 24 Hours | 2 Hours | 24 Hours |
| GCSF[1] | 4.5 | 8.4 | 0.47 | 1.1 |
| Cement[2] | 12.4 | 21.6 | 0.64 | 1.1 |

[1]Gypsum/cement/silica fume fiber board.
[2]Cement fiber board.

TABLE XII

MOR'S 3 POINT LOADING (DRY) (ASTM C 947)

| | MOR[3] | | PEL[4] | |
| --- | --- | --- | --- | --- |
| | Long Direction | Short Direction | Long Direction | Short Direction |
| GCSF[1] | 2146.5 | 2297.9 | 1269.5 | 1986.2 |
| Cement[2] | 2123 | 1928.9 | 1458.8 | 1146.2 |

[1]Gypsum/cement/silica fume fiber board.
[2]Cement fiber board.
[3]Modules of Rupture (lb/in$^2$).
[4]Proportional Elastic Limit (lb/in$^2$).

TABLE XIII

MOR'S 3 POINT LOADING (WET) (ASTM C 947)

| | MOR[3] | | PEL[4] | |
| --- | --- | --- | --- | --- |
| | Long Direction | Short Direction | Long Direction | Short Direction |
| GCSF[1] | 1141.4 | 1332 | 509.2 | 474.3 |
| Cement[2] | 1402.7 | 1385.8 | 760.7 | 462.3 |

[1]Gypsum/cement/silica fume fiber board.
[2]Cement fiber board.

TABLE XIII-continued

MOR'S 3 POINT LOADING (WET) (ASTM C 947)

| | MOR[3] | | PEL[4] | |
| --- | --- | --- | --- | --- |
| | Long Direction | Short Direction | Long Direction | Short Direction |

[3]Modules of Rupture (lb/in$^2$).
[4]Proportional Elastic Limit (lb/in$^2$).

TABLE XIV

NAIL PULL (ASTM C 473)

| | Pounds Force (dry)[3] | Pounds Force (wet)[3] |
| --- | --- | --- |
| GCSF[1] | 688 | 356 |
| Cement[2] | 615 | 439 |

[1]Gypsum/cement/silica fume fiber board.
[2]Cement fiber board.
[3]Testing parameters included:
0.400 inch nail head diameter;
0.121 inch shank diameter; and
a loading rate of one foot/minute.

As shown in the tables above, boards made according to the invention exhibited comparable or improved physical properties as compared to cement fiber boards which did not include gypsum or silica fume. Furthermore, the boards according to the invention advantageously took much less time to process (three hour press/clamp time) as compared to the cement fiber boards (eight hour press/clamp time).

EXAMPLE 4

A master blend binder according to the invention was prepared with the components set forth in the amounts stated in Table XV below:

TABLE XV

| Material | Approx. Weight Percent |
| --- | --- |
| Beta-gypsum (Stucco) | 61 |
| Type III Portland Cement | 26 |
| Silica Fume | 13 |

A cementitious composition according to the invention was then prepared with the binder and the components set forth in the amounts stated in Table XVI below:

TABLE XVI

| Material | Weight Percent |
| --- | --- |
| Binder from Table XV | 59.3 |
| Pumice Aggregate | 39.5 |
| W.R.A.[1] | 0.87 |
| Water Repellent Agent[2] | 0.11 |
| Accelerator (ball-milled CaSO$_4$.2H$_2$O gypsum dihydrate[3]) | 0.058 |

[1]Water reducing agent or wetting agent including lignosulfonates and/or naphthalene sulfonates manufactured by Georgia Pacific Corp. and Henkel Corp., respectively.
[2]A silicone product or like material, e.g., VEOCEAL 2100 and VEOCEAL 1311 products (both TM designations of products manufactured by Wacker Silicone Corp.)
[3]See U.S. Pat. Nos. 3,920,465, 3,870,538 and 4,019,920.

The materials identified in Table XVI were mixed and 100 grams thereof was mixed with 35.6 grams of water. About 1 wt. % to about 5 wt. % of a polymer latex (acrylic or SBR) was added to the mixture to improve flexibility. The mixture was then formed into boards according to the invention using a glass matt/scrim composite. The boards were tested for water absorption, nail holding properties, deflection, compression strength (wet and dry), water wicking characteristics and other ASTM specification requirements. The boards met the ASTM specifications with respect to each test.

Figure 3:
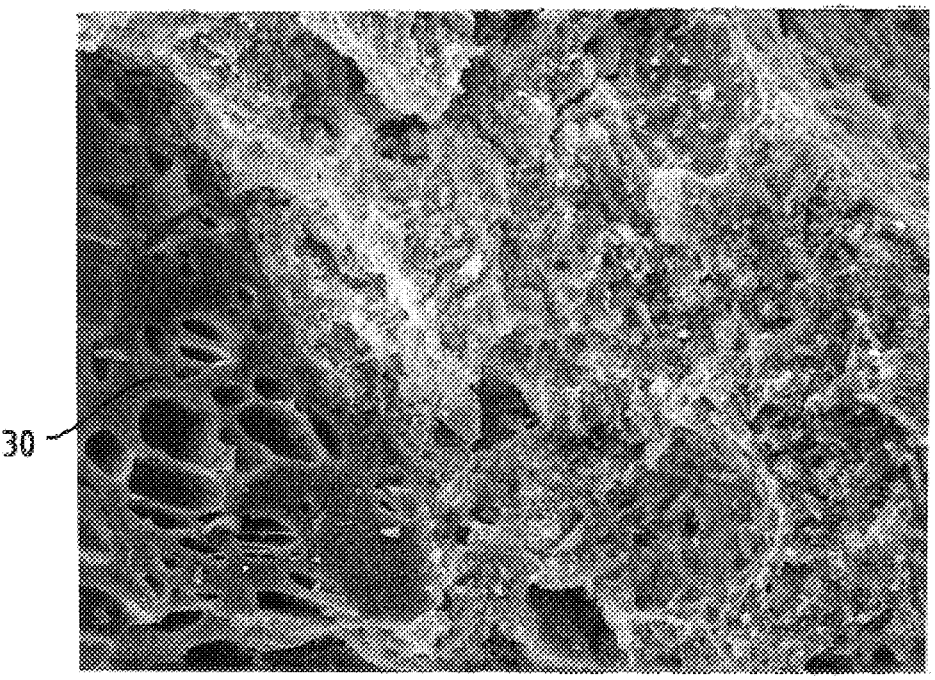
FIG. 3 is a scanning electron microscope (SEM) micrograph (500×) of a board made from a composition according to the invention disclosed in Example 4.
Figure 4:
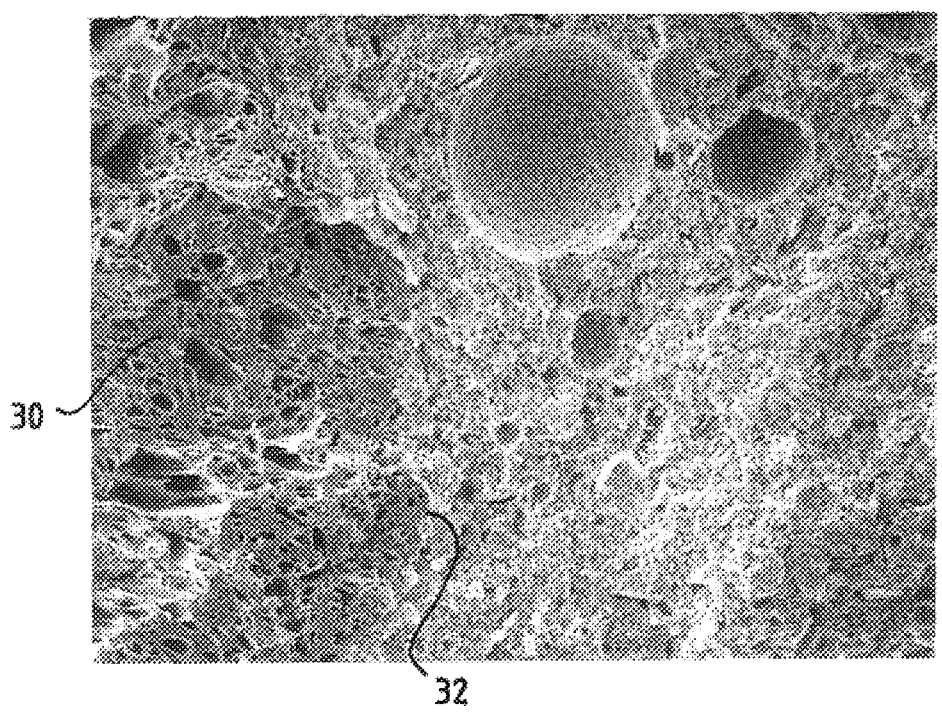
FIG. 4 is an SEM micrograph (100×) of the board shown in FIG. 3.
Figure 5:
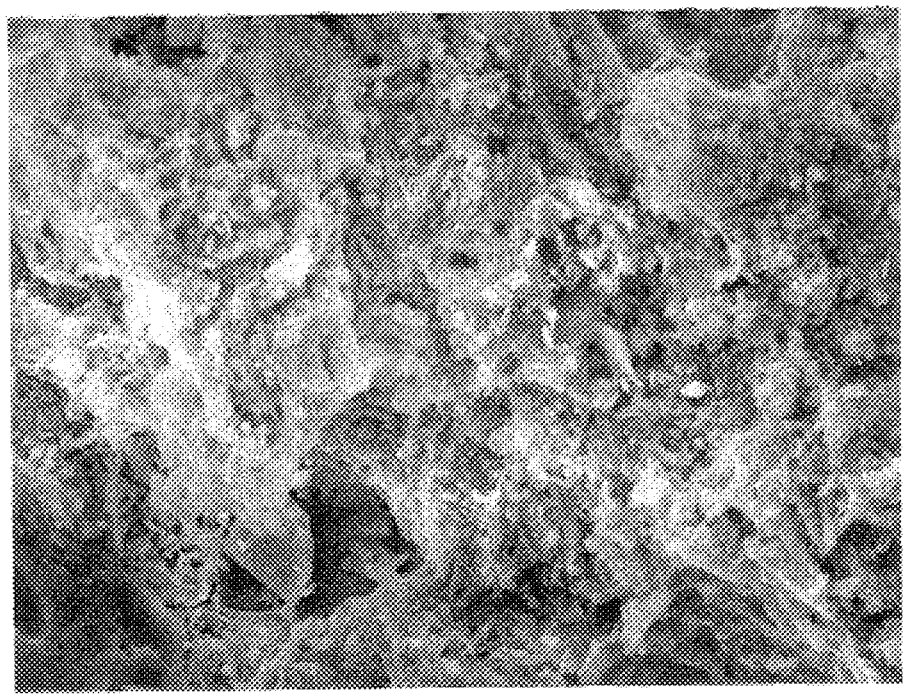
FIG. 5 is an SEM micrograph (1000×) of the board shown in FIG. 3.

The scanning electron microscope (SEM) micrographs shown in FIGS. 3, 4, and 5 were made of a cured sample according to Example 4. An arrow 30 points to pumice in the sample, illustrating that in a composition according to the invention, the pumice becomes part of the hydrated calcium silicate (CSH) matrix, substantially eliminating any transition zone 32 between the pumice aggregate and the cement paste. This indicates that a pozzolanic reaction occurs between the aggregate surface and the binder, thus improving mechanical properties.

EXAMPLE 5

The master blend binder set forth in Table XV of Example 4 was blended with the components disclosed in Table XVII below to form a cementitious composition according to the invention.

TABLE XVII

| Material | Weight Percent |
| --- | --- |
| Binder of Table XV | 73.8 |
| Pumice Aggregate | 24.6 |
| Perlite | 1.47 |
| W.R.A.[1] | 0.87 |
| Water Repellent Agent[2] | 0.11 |
| Accelerator (ball-milled $CaSO_4.2H_2O$ gypsum dihydrate[3]) | 0.042 |

[1]Water reducing agent or wetting agent including lignosulfonates and/or naphthalene sulfonates manufactured by Georgia Pacific Corp. and Henkel Corp., respectively.
[2]A silicone product or like material, e.g., VEOCEAL 2100 and VEOCEAL 1311 products (both TM designations of products manufacturd by Wacker Silicone Corp.)
[3]See U.S. Pat. Nos. 3,920,465, 3,870,538 and 4,019,920.

The materials identified in Table XVII were mixed and 100 grams thereof was mixed with 35.6 grams of water. About 1 wt. % to about 5 wt. % of a polymer latex (acrylic or SBR) was added to the mixture to improve flexibility. The mixture was then formed into boards according to the invention using a glass matt/scrim composite. The boards were tested for water absorption, nail holding properties, deflection, compression strength (wet and dry), water wicking characteristics and other ASTM specification requirements. The boards met the ASTM specifications with respect to each test.

It is noted that the silica fume/Portland cement ratio of the products produced in Examples 4 and 5 was at least about 0.50/1.0. Although this ratio produces an acceptable product, it is not as cost effective as products made from a "dry" blend process having a silica fume/Portland cement ratio of 0.30/1.0.

EXAMPLE 6

A master blend binder "A" according to the invention was prepared in the amounts stated in Table XVIII below. A comparative binder "B," also disclosed in Table XVIII, was prepared in the amounts stated in the table.

TABLE XVIII

| | Approx. Weight Percent | |
| Material | Binder "A" | Binder "B" |
| --- | --- | --- |
| Beta-gypsum (Stucco) | 40 | 46 |
| Type III Portland Cement | 46 | 52 |
| Silica Fume | 14 | 2 |

The gypsum and Portland cement components of each of the binders identified in Table XVIII were dry mixed. Both of the binders were prepared by pre-dispersing silica fume in water, followed by mixing the silica fume/water mixture with the dry-blended gypsum/Portland cement mixture. For each 600 grams of binder, 360 cc of water was used. The cementitious mixtures were formed into two-inch by two-inch by two-inch (2"×2"×2") cubes which were sealed in a plastic bag and cured at room temperature (about 25° C.) for about twenty-eight days. The cubes were subjected to compressive strength tests and then each cube was immersed in a separate container of water, as a continuous ongoing test.

The fissures (cracks) that occurred in the cubes during the compressive strength test, exposed cross sections of the cube cores to "sulfate reactivity," and thus to the possibility of the formation of ettringite. Ettringite formation was monitored by checking the pH of the water twice a month, followed by changing (replacing) the water with fresh tap water. Samples whose water measured a pH above 8.5 indicated ettringite formation. Samples measuring a pH of less than 7.5 indicated that aggressive ettringite formation was not occurring. The water-immersed cube samples made from the Binder "A" maintained a pH of about 7.0 over six months. Water-immersed cubes made from the comparative Binder "B" were consistently at or above pH 8.5, indicating that aggressive ettringite formation was occurring.

Figure 6:
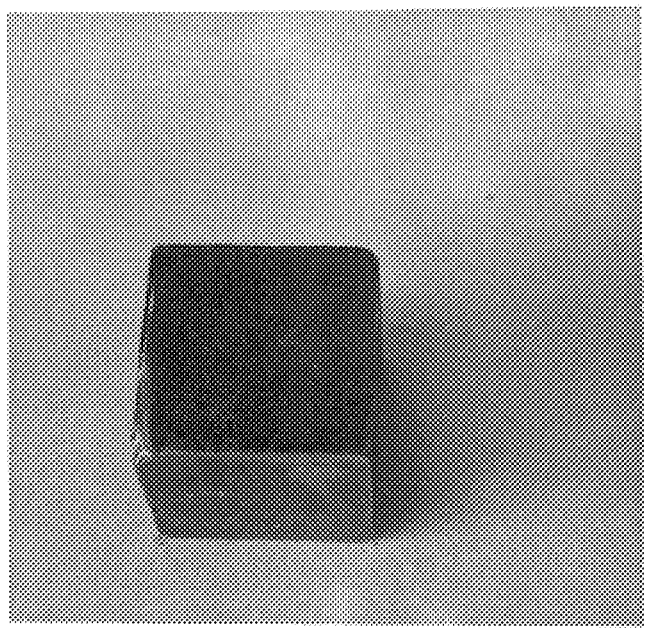
FIG. 6 is a photograph of a cube made from a binder according to the invention after immersion in water for six months.
Figure 7:
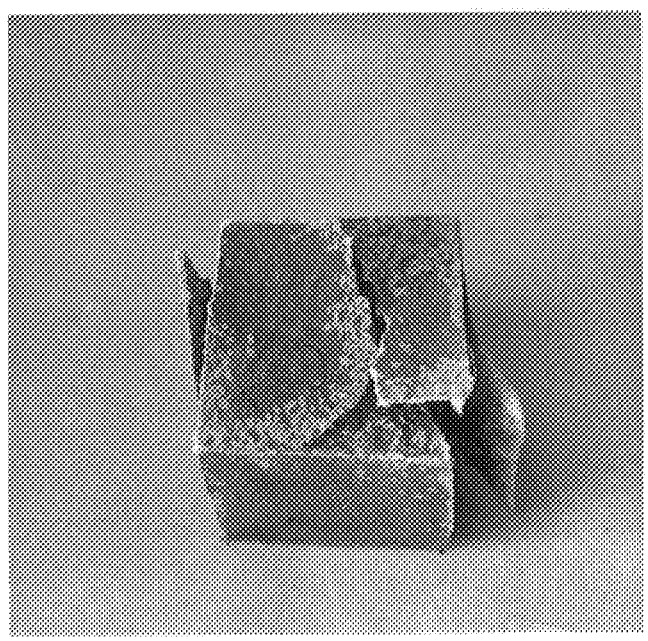
FIG. 7 is a photograph of a cube made from a comparative binder after immersion in water for six months.

The formation of ettringite also became apparent visually in the cubes made from the comparative binder. FIG. 6 shows a cube made from the Binder "A," after six months of water immersion. FIG. 7, shows a cube made with the comparative Binder "B," also after six months of water immersion.

Figure 8:
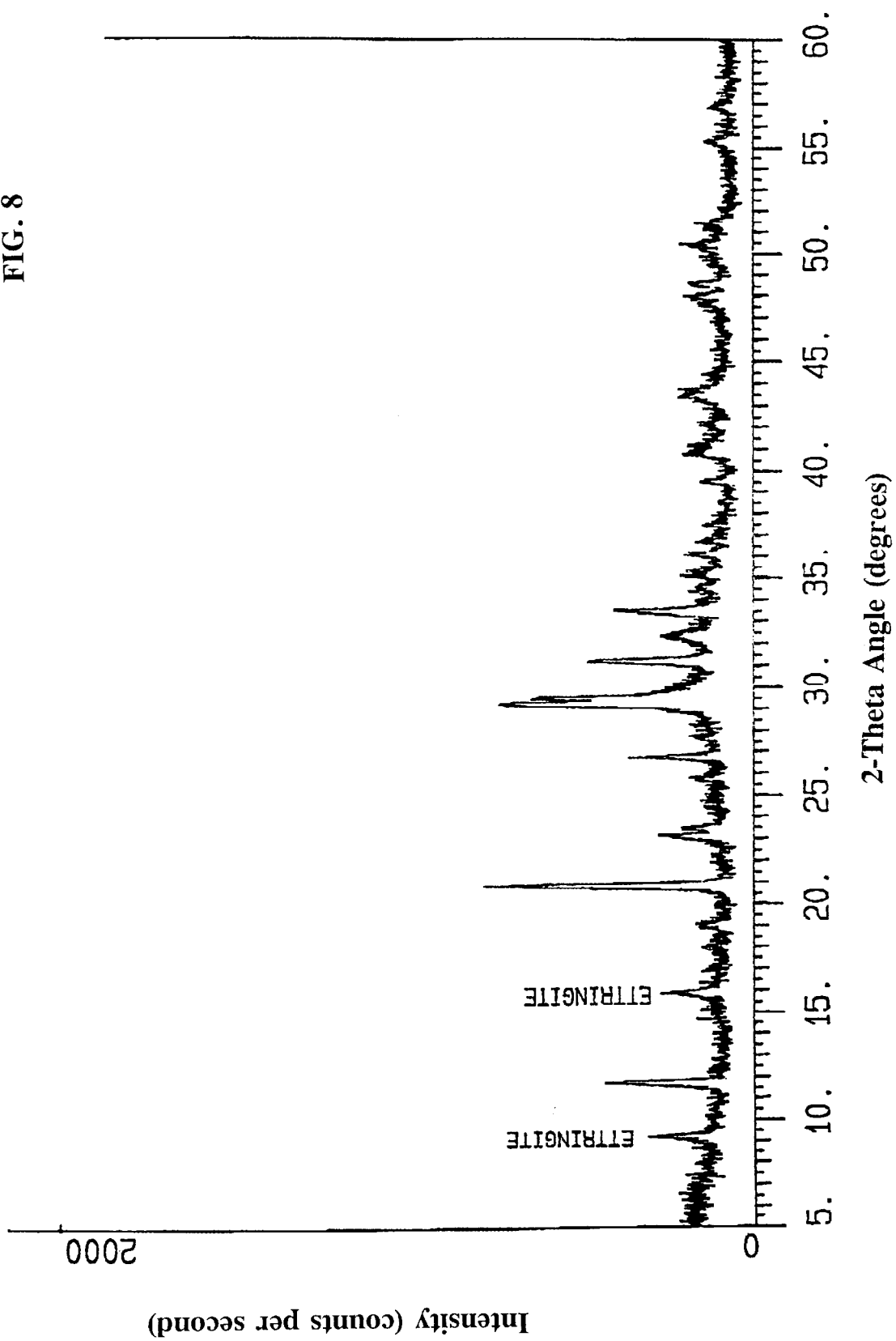
FIG. 8 is an X-Ray diffraction chart of Radiation Counts (intensity) vs. Angle of Diffraction (2-theta angle) of the cube shown in FIG. 6.

To further verify the formation of ettringite XRD (X-Ray Diffraction) tests were run on both cubes. The chart shown in FIG. 8 is for the cube shown in FIG. 6 made from the inventive Binder "A" and the chart shown in FIG. 9 for the cube shown in FIG. 7 made from the comparative Binder "B." The charts illustrate Intensity (counts per second) vs. 2-Theta Angle (degrees). These charts show ettringite formation in both of the cubes. However, the chart (FIG. 9) for the comparative cube shown in FIG. 7 indicates higher, increasing, amounts of aggressive ettringite formation. The chart (FIG. 8) indicates a stabilized (i.e., non-expanding) level of ettringite in the cube shown in FIG. 6 made from a binder according to the invention.

EXAMPLE 7

A master blend binder according to the invention was prepared with the components set forth in the amounts stated in Table XIX below:

TABLE XIX

| Material | Approx. Weight Percent |
| --- | --- |
| Beta-gypsum (Stucco) | 42 |
| Type III Portland Cement | 48.4 |
| Silica Fume | 9.6 |

Rather than dry-blending the gypsum, Portland cement, and silica fume components, the silica fume was pre-dispersed in water and the silica fume/water mixture was then mixed with a dry blend of gypsum and Portland cement. For each 600 grams of binder, 360 cc of water was used. The mixture was then formed into two-inch by two-inch by two-inch (2"×2"×2") cubes which were sealed in a plastic bag and cured at room temperature (about 25° C.). The cubes were subjected to compressive strength tests twenty-eight days after their formation. The cubes exhibited excellent wet compressive strength of between 4429 and 4455 pounds/square inch.

The foregoing detailed description is given for clearness of understanding only, and no unnecessary limitations should be understood therefrom, as modifications within the scope of the invention will be apparent to those skilled in the art.

We claim:

1. A cementitious binder comprising:
   (a) calcium sulfate hemihydrate;
   (b) a cement component comprising Portland cement; and
   (c) a third component comprising silica fume, said silica fume comprising up to about 0.6 wt. % $Al_2O_3$, and being at least about 92 wt. % amorphous $SiO_2$.

2. The cementitious binder of claim 1 prepared by dry-blending the calcium sulfate hemihydrate, the cement component, and the third component and wherein a ratio of the third component to the cement component is at least about 0.3/1.0.

3. The cementitious binder of claim 1 prepared by dry-blending the calcium sulfate hemihydrate and the cement component, followed by mixing with water into which the third component has been pre-dispersed, and wherein the ratio of the third component to the cement component is at least about 0.2/1.0.

4. The cementitious binder of claim 1 comprising about 20 wt. % to about 75 wt. % calcium sulfate hemihydrate, about 10 wt. % to about 60 wt. % of the cement component, and about 4 wt. % to about 20 wt. % of the third component.

5. The cementitious binder of claim 1 for use in interior applications comprising about 60 wt. % to about 75 wt. % calcium sulfate hemihydrate, about 20 wt. % to about 31 wt. % of the cement component, and about 6 wt. % to about 9 wt. % of the third component.

6. The cementitious binder of claim 3 for use in interior applications comprising about 60 wt. % to about 75 wt. % calcium sulfate hemihydrate, about 21 wt. % to about 33 wt. % of the cement component, and about 4 wt. % to about 7 wt. % of the third component.

7. The cementitious binder of claim 1 for use in interior applications for wet areas comprising about 50 wt. % to about 60 wt. % calcium sulfate hemihydrate, about 31 wt. % to about 37 wt. % of the cement component, and about 9 wt. % to about 11 wt. % of the third component.

8. The cementitious binder of claim 3 for use in interior applications for wet areas comprising about 50 wt. % to about 60 wt. % calcium sulfate hemihydrate, about 33 wt. % to about 42 wt. % of the cement component, and about 7 wt. % to about 8 wt. % of the third component.

9. The cementitious binder of claim 1 for use in exterior applications comprising about 40 wt. % to about 50 wt. % calcium sulfate hemihydrate, about 39 wt. % to about 46 wt. % of the cement component, and about 12 wt. % to about 14 wt. % of the third component.

10. The cementitious binder of claim 3 for use in exterior applications comprising about 40 wt. % to about 50 wt. % calcium sulfate hemihydrate, about 42 wt. % to about 50 wt. % of the cement component, and about 9 wt. % to about 10 wt. % of the third component.

11. The cementitious binder of claim 1 wherein the calcium sulfate hemihydrate is calcium sulfate beta-hemihydrate.

12. The cementitious binder of claim 1 wherein the cement component is Type III Portland cement.

13. A cementitious composition comprising:
   (a) up to about 90 wt. % of a filler component selected from the group consisting of aggregates and fibers; and
   (b) about 10 wt. % to 100 wt. % of a binder comprising
      (i) calcium sulfate hemihydrate;
      (ii) a cement component comprising Portland cement; and
      (iii) a third component comprising silica fume, said silica fume comprising up to about 0.6 wt. % $Al_2O_3$, and being at least about 92 wt. % amorphous $SiO_2$.

14. The composition of claim 13 wherein the filler component is a cellulosic fiber.

15. The composition of claim 13 wherein the filler component is selected from the group consisting of wood fiber, plant fiber, paper, and mixtures thereof.

16. The composition of claim 13 wherein the filler component is a cellulosic fiber, the fiber being between about 10 wt. % and about 30 wt. % of the cementitious composition.

17. The composition of claim 13 wherein the filler component is a pozzolanic aggregate.

18. The composition of claim 17 wherein the pozzolanic aggregate is between about 10 wt. % and about 50 wt. % of the cementitious composition.

19. The composition of claim 18 wherein the pozzolanic aggregate is selected from the group consisting of hollow silicate spheres, perlite, pumice, trass, diatomaceous earth and mixtures thereof.

20. A construction material prepared by combining a cementitious composition with at least a slight stoichiometric excess of water, said cementitious composition comprising:
   (a) up to about 90 wt. % of a filler component selected from the group consisting of aggregates and fibers; and
   (b) about 10 wt. % to 100 wt. % of a binder comprising
      (i) calcium sulfate hemihydrate;
      (ii) a cement component comprising Portland cement; and
      (iii) a third component comprising silica fume, said silica fume comprising up to about 0.6 wt. % $Al_2O_3$, and being at least about 92 wt. % amorphous $SiO_2$.

21. The construction material of claim 20 wherein the construction material is a fiberboard for interior use made from a composition comprising:
   (a) about 10 wt. % to about 30 wt. % cellulosic fiber; and
   (b) about 90 wt. % to about 70 wt. % of a binder, the binder comprising about 60 wt. % to about 75 wt. % calcium sulfate hemihydrate, about 20 wt. % to about 31 wt. % of the cement component, and about 6 wt. % to about 9 wt. % of the third component.

22. The construction material of claim 20 wherein the construction material is a fiberboard for interior use made from a composition comprising:

(a) about 10 wt. % to about 30 wt. % cellulosic fiber; and
(b) about 90 wt. % to about 70 wt. % of a binder, the binder prepared by dry-blending the calcium sulfate hemihydrate and the cement component, followed by mixing with the stoichiometric excess of water into which the third component has been pre-dispersed, and wherein the ratio of the third component to the cement component is 0.2/1.0, the binder comprising about 60 wt. % to about 75 wt. % calcium sulfate hemihydrate, about 21 wt. % to about 33 wt. % of the cement component, and about 4 wt. % to about 7 wt. % of the third component.

23. The construction material of claim 20 wherein the construction material is outdoor siding made from a composition comprising:
(a) about 15 wt. % to about 30 wt. % cellulosic fiber; and
(b) about 85 wt. % to about 70 wt. % of a binder, the binder comprising about 40 wt. % to about 50 wt. % calcium sulfate hemihydrate, about 39 wt. % to about 46 wt. % of the cement component, and about 12 wt. % to about 14 wt. % of the third component.

24. The construction material of claim 20 wherein the construction material is an outdoor siding made from a composition comprising:
(a) about 15 wt. % to about 30 wt. % cellulosic fiber; and
(b) about 85 wt. % to about 70 wt. % of a binder, the binder prepared by dry-blending the calcium sulfate hemihydrate and the cement component, followed by mixing with the stoichiometric excess of water into which the third component has been pre-dispersed, and wherein the ratio of the third component to the cement component is 0.2/1.0, the binder comprising about 40 wt. % to about 50 wt. % calcium sulfate hemihydrate, about 42 wt. % to about 50 wt. % of the cement component, and about 9 wt. % to about 10 wt. % of the third component.

25. The construction material of claim 20 wherein the construction material is a backer board or a floor underlay made from a composition comprising:
(a) about 10 wt. % to about 50 wt. % aggregate; and
(b) about 90 wt. % to about 50 wt. % of a binder, the binder comprising about 50 wt. % to about 60 wt. % calcium sulfate hemihydrate, about 31 wt. % to about 37 wt. % of the cement component, and about 9 wt. % to about 11 wt. % of the third component.

26. The construction material of claim 20 wherein the construction material is backer board or floor underlay made from a composition comprising:
(a) about 10 wt. % to about 50 wt. % aggregate; and
(b) about 90 wt. % to about 50 wt. % of a binder, the binder prepared by dry-blending the calcium sulfate hemihydrate and the cement component, followed by mixing with the stoichiometric excess of water into which the third component has been pre-dispersed, and wherein the ratio of the third component to the cement component is 0.2/1.0, the binder comprising about 50 wt. % to about 60 wt. % calcium sulfate hemihydrate, about 33 wt. % to about 42 wt. % of the cement component, and about 7 wt. % to about 8 wt. % of the third component.

27. The construction material of claim 25 wherein the aggregate is a pozzolanic aggregate.

28. The construction material of claim 26 wherein the aggregate is a pozzolanic aggregate.

29. The construction material of claim 20 wherein the construction material is a self-leveling floor made from a composition comprising:

(a) about 25 wt. % to about 85 wt. % aggregate; and
(b) about 75 wt. % to about 15 wt. % of a binder, the binder comprising about 40 wt. % to about 50 wt. % calcium sulfate hemihydrate, about 39 wt. % to about 46 wt. % of the cement component, and about 12 wt. % to about 14 wt. % of the third component.

30. The construction material of claim 20 wherein the construction material is a self-leveling floor made from a composition comprising:
(a) about 25 wt. % to about 85 wt. % aggregate; and
(b) about 75 wt. % to about 15 wt. % of a binder, the binder prepared by dry-blending the calcium sulfate hemihydrate and the cement component, followed by mixing with the stoichiometric excess of water into which the third component has been pre-dispersed, and wherein the ratio of the third component to the cement component is 0.2/1.0, the binder comprising about 40 wt. % to about 50 wt. % calcium sulfate hemihydrate, about 42 wt. % to about 50 wt. % of the cement component, and about 9 wt. % to about 10 wt. % of the third component.

31. The construction material of claim 29 wherein the aggregate is selected from the group consisting of sand, pozzolanic aggregate, and mixtures thereof.

32. The construction material of claim 30 wherein the aggregate is selected from the group consisting of sand, pozzolanic aggregate, and mixtures thereof.

33. The construction material of claim 20 wherein the construction material is a road patching material made from a composition comprising:
(a) about 0 wt. % to about 75 wt. % aggregate; and
(b) about 100 wt. % to about 25 wt. % of a binder, the binder comprising about 40 wt. % to about 50 wt. % calcium sulfate hemihydrate, about 39 wt. % to about 46 wt. % of the cement component, and about 12 wt. % to about 14 wt. % of the third component.

34. The construction material of claim 20 wherein the construction material is a road patching material made from a composition comprising:
(a) about 0 wt. % to about 75 wt. % aggregate; and
(b) about 100 wt. % to about 25 wt. % of a binder, the binder prepared by dry-blending the calcium sulfate hemihydrate and the cement component, followed by mixing with the stoichiometric excess of water into which the third component has been pre-dispersed, and wherein the ratio of the third component to the cement component is 0.2/1.0, the binder comprising about 40 wt. % to about 50 wt. % calcium sulfate hemihydrate, about 42 wt. % to about 50 wt. % of the cement component, and about 9 wt. % to about 10 wt. % of the third component.

35. The construction material of claim 33 wherein the aggregate is selected from the group consisting of sand, pozzolanic aggregate, and mixtures thereof.

36. The construction material of claim 34 wherein the aggregate is selected from the group consisting of sand, pozzolanic aggregate, and mixtures thereof.

37. The cementitious binder of claim 1, further comprising a pozzolanic aggregate.

38. The cementitious binder of claim 1, wherein said silica fume has a particle average diameter between about 0.1 and about 0.3 microns.

39. The cementitious binder of claim 1, wherein said silica fume has a specific surface area between about 20 $meter^2$/gram and about 30 $meter^2$/gram as measured by BET.

40. The cementitious binder of claim 1, wherein the cement component further comprises a material selected from the group consisting of fly ash and ground blast slag.

41. The cementitious composition of claim 13, wherein said silica fume has a particle average diameter between about 0.1 and about 0.3 microns.

42. The cementitious composition of claim 13, wherein said silica fume has a specific surface area between about 20 meter$^2$/gram and about 30 meter$^2$/gram as measured by BET.

43. The cementitious composition of claim 13, wherein the cement component further comprises a material selected from the group consisting of fly ash and ground blast slag.

44. A cementitious composition comprising:
   (a) calcium sulfate hemihydrate;
   (b) a cement component comprising Portland cement; and
   (c) rice-husk ash comprising up to about 0.6 wt. % $Al_2O_3$ and being at least about 92 wt. % amorphous $SiO_2$.

45. A fire-proofing spray or fire-stopping material, comprising:
   (a) about 0 wt. % to about 27 wt. % of an aggregate;
   (b) about 1 wt. % to about 16 wt. % vermiculite ore; and
   (c) about 99 wt. % to about 54 wt. % of a binder comprising
      (i) about 60 wt. % to about 75 wt. % calcium sulfate hemihydrate;
      (ii) about 20 wt. % to about 31 wt. % of a cement component comprising Portland cement; and
      (iii) about 6 wt. % to about 9 wt. % of a third component comprising silica fume, said silica fume comprising up to about 0.6 wt. % $Al_2O_3$, and being at least about 92 wt. % amorphous $SiO_2$; and
   (d) a stoichiometric excess of water.

46. A fire-proofing spray or fire-stopping material, comprising:
   (a) about 0 wt. % to about 27 wt. % of an aggregate;
   (b) about 1 wt. % to about 16 wt. % vermiculite ore;
   (c) about 99 wt. % to about 54 wt. % of a binder, wherein the binder comprises about 60 wt. % to about 75 wt. % calcium sulfate hemihydrate, about 21 wt. % to about 33 wt. % of a cement component comprising Portland cement, and about 4 wt. % to about 7 wt. % of a third component comprising silica fume, said silica fume comprising up to about 0.6 wt. % $Al_2O_3$, and being at least about 92 wt. % amorphous $SiO_2$; and wherein
   the binder is prepared by dry-blending the calcium sulfate hemihydrate and the cement component, followed by mixing with a stoichiometric excess of water into which the third component has been pre-dispersed, and wherein the ratio of the third component to the cement component is about 0.2/1.0.

47. A cementitious product made by a process comprising the steps of:
   (a) providing calcium sulfate hemihydrate;
   (b) providing a Portland cement;
   (c) providing a silica fume, said silica fume being a byproduct obtained from the production of silicon or ferro-silicon metals, and comprising up to about 0.6 wt. % $Al_2O_3$ and being at least about 92 wt. % amorphous $SiO_2$;
   (d) blending said calcium sulfate hemihydrate, cement, silica fume with water to form a composition;
   (e) forming the composition into a shape; and
   (f) curing the shaped composition.

48. The cementitious product made by the process of claim 47, the process further comprising:
   covering said composition with plastic wrapping for about 3 to 7 days during step (f).

49. The construction material of claim 20 further comprising:
   (e) up to about 2 wt. % glass fibers; and
   (f) up to about 1 wt. % of a thickening agent selected from the group consisting of cellulose derivatives, acrylic resins and mixtures thereof.

50. A fire-proofing spray or fire-stopping material of claim 45 comprising:
   (e) up to about 2 wt. % glass fibers; and
   (f) up to about 1 wt. % of a thickening agent selected from the group consisting of cellulose derivatives, acrylic resins and mixtures thereof.

51. The construction material of claim 20 wherein the aggregate includes a pozzolanic aggregate selected from the group consisting of hollow silicate spheres, perlite, pumice, and mixtures thereof.

52. A fireproofing spray or firestopping material of claim 45 aggregate includes a pozzolanic aggregate selected from the group consisting of hollow silicate spheres, perlite, pumice, trass, diatomaceous earth and mixtures thereof.

* * * * *

UNITED STATES PATENT AND TRADEMARK OFFICE
CERTIFICATE OF CORRECTION

PATENT NO. : 5,858,083
DATED : January 12, 1999
INVENTOR(S) : Stav et al.

It is certified that error appears in the above-identified patent and that said Letters Patent is hereby corrected as shown below:

Claim 50, col. 22, line 31, following 45, insert --further--; and

Claim 52, col. 22, line 41, following 45, insert --wherein the--.

Signed and Sealed this

Eighteenth Day of May, 1999

Attest:

Q. TODD DICKINSON

*Attesting Officer*    Acting Commissioner of Patents and Trademarks